United States Patent [19]

Drake et al.

[11] Patent Number: 4,511,404

[45] Date of Patent: Apr. 16, 1985

[54] COMPOSITIONS FOR INHIBITING CORROSION OF METAL SURFACES

[75] Inventors: Cyril F. Drake, Harlow; Ronald Jones, Leeds; Paul F. Bateson, Duxford; Ronald J. Grant, Harlow; Martin E. Burrage, Ilkley, all of England

[73] Assignee: ITT Industries, Inc., New York, N.Y.

[21] Appl. No.: 548,206

[22] Filed: Nov. 2, 1983

[30] Foreign Application Priority Data

Nov. 2, 1982 [GB] United Kingdom ................ 8231658

[51] Int. Cl.$^3$ ................................................ C09D 5/08
[52] U.S. Cl. ............................... 106/14.12; 106/14.25; 106/14.39; 106/292; 106/306; 524/417; 524/436
[58] Field of Search ............... 106/14.12, 14.25, 14.39, 106/292, 306; 524/417, 436

[56] References Cited

U.S. PATENT DOCUMENTS

| | | | |
|---|---|---|---|
| 2,332,209 | 10/1943 | Enquist | 106/14.12 |
| 3,892,577 | 7/1975 | Sugahara et al. | 106/14.12 |
| 4,110,128 | 8/1978 | Dreulle et al. | 106/14.12 |
| 4,126,469 | 11/1978 | Longuepee | 106/14.12 |
| 4,297,237 | 10/1981 | Boffardi | 106/14.12 |
| 4,346,065 | 8/1982 | Maurer et al. | 106/14.12 |
| 4,351,796 | 9/1982 | Marshall | 106/14.12 |

FOREIGN PATENT DOCUMENTS

| | | | |
|---|---|---|---|
| 72234 | 9/1979 | Japan | 106/14.12 |
| 116768 | 8/1980 | Japan | 106/14.12 |

*Primary Examiner*—Lorenzo B. Hayes
*Attorney, Agent, or Firm*—James B. Raden; Harold J. Holt

[57] ABSTRACT

Corrosion inhibiting compositions for ferrous and non-ferrous metal surfaces comprise one or more crystalline polyphosphates, e.g. a strontium tripolyphosphate. The compositions have particular application in the preparation of corrosion inhibiting paint compositions. A method of preparation of the polyphosphate materials is described.

4 Claims, No Drawings

COMPOSITIONS FOR INHIBITING CORROSION OF METAL SURFACES

This invention relates to compositions for inhibiting corrosion of metal surfaces to which they may be applied, to paints containing such compositions and to processes for the preparation and use of the compositions.

One of the major problems involved in the use of metals as structural materials is that of corrosion of the metal. Ferrous metals are particularly susceptible but corrosion is also experienced with non-ferrous metals such as aluminium and zinc. The mechanism of corrosion is incompletely understood, but it is well known that the process is accelerated under hostile conditions, typically in industrial and marine environments. The standard technique for reducing corrosion is to apply to the metal surface a primer coating containing one or more corrosion inhibiting materials. Such primer coatings generally comprise a resinous binding medium in which finely ground pigments ae dispersed, the purpose of these pigments being either to provide opacity and color or to provide corrosion inhibition, these latter being known as active pigments. The most commonly used active pigments are red lead and calciumplumbate, but these materials are highly toxic. Zinc chromate is also employed as a corrosion inhibitor, but it does not possess the level of performance of the lead pigments and can also cause color bleeding of a subsequent paint coat. Furthermore hexavalent chromium salts are suspected of having carcinogenic activity.

More recently zinc phosphate has been employed as a non-toxic alternative to lead and chromate pigments. Compositions employing this material are described in U.K. Patent Specifications Nos. 904,861 and 915,512. It is claimed that this material is almost as effective as the previously employed toxic pigments, but its performance is poor in certain binder media and under conditions of exposure where the atmospheric sulphur dioxide level is low, typically marine conditions. Furthermore where a primed steel surface is to be welded, the use of zinc phosphate paints should preferably be avoided. The intense heat generated in the welding process can cause vaporization of the paint producing toxic fumes of zinc oxide and/or free zinc.

The aforementioned U.K. Pat. Nos. 904,861 and 915,512 also describe the use of calcium phosphate (tricalcium phosphate, calcium hydrogen phosphate and monocalcium dihydrogen phosphate) which avoid the toxicity problem experienced with zinc based paints. However these calcium salts do not possess the optimum values of water solubility rate of solution and pH for effective corrosion inhibition over a range of environmental conditions.

According to one aspect of the invention there is provided a composition for inhibiting corrosion of a ferrous or non-ferrous metal surface, said composition including one or more crystalline metal polyphosphates.

According to another aspect of the invention there is provided a paint formulation adapted to inhibit corrosion of a metal to which it is applied, said formulation including one or more metal polyphosphates dispersed in a resin binder.

We have found that crystalline metal polyphosphates can be formulated such that they have corrosion inhibiting properties together with a water solubility that renders them suitable for use inter alia in paint compositions. The polyphosphate may include one or more polyvalent metals as the cationic constituent. Typically the corrosion inhibiting composition may include single or mixed metal polyphosphates of zinc, sodium, potassium, strontium, barium, copper, or mixtures of said polyphosphates. In some cases, where the solubility is sufficiently low and the inhibition effect is retained, they may be especially useful in water based paints.

In particular we have found that strontium tripolyphosphate is a very effective material both as a paint additive and for general use as an inhibitor of corrosion of ferrous and non ferrous metals.

The polyphosphate materials may be prepared by precipitation from aqueous solutions of the corresponding metal salts. We have found that although these polyphosphates have sufficient water solubility to provide corrosion inhibition this solubility is sufficiently low to allow their preparation by precipitation from solution.

Typically we prepare metal tripolyphosphate salts by mixing solutions of pentasodium tripolyphosphate and a solution containing the corresponding metal salt or salts. Suitable metal salts include, but are not limited to, chlorides and sulphates.

The corrosion inhibiting materials may be employed with a variety of paint resin systems. These resins include, but are not limited to, oleoresinous media, chlorinated rubbers, epoxy resins, urethanes, acrylic resins, alkyd resins, vinyl copolymers, amino, vinyl or phenolic resins, polybutadienes, cellulosic materials and mixtures thereof. In some applications the paint may include a water soluble or water based resin, e.g. for electrocoating applications.

Typically the polyphosphate inhibitor material comprises 7.5 to 40 weight percent of the total paint composition.

By way of example we have prepared zinc sodium tripolyphosphate ($Zn_2NaP_3O_{10}.9H_2O$). Penta-sodium triphosphate (214.2 g, 0.58 mole, BDH reagent grade) was dissolved in demineralized water to give a 10% solution. Zinc sulphate heptahydrate (335.6 g, 1.16 mole, Analar grade) was dissolved in demineralized water to give a 0.5 molar solution. The zinc sulphate solution was added dropwise to the sodium triphosphate solution with stirring. The precipitate was filtered off and washed with demineralized water. The precipitate was dried in a vacuum desiccator at room temperature to give 321.5 g of product (97% yield based on $Zn_2NaP_3O_{10}.9H_2O$). Optical microscopy showed average particle size to be $10\times 4$ microns.

We have also prepared strontium tripolyphosphate ($Sr_5(P_3O_{10})_2.17H_2O$) by the following process.

Pentasodium tripolyphosphate (73.6 g, BDH reagent grade) was dissolved in 2 L demineralized water. Strontium chloride hexahydrate (146 g, Analar grade) was dissolved in 1 L demineralized water and the solution was added dropwise to the tripolyphosphate solution with stirring. The precipitated strontium tripolyphosphate was separated by filtration, washed with demineralized water and dried at room temperature to give 106 g of product. This represents an overall yield of 70% based on $Sr_5(P_3O_{10}).17H_2O$.

The polyphosphate materials described herein may be used as corrosion inhibitors in a variety of applications. In particular they are efficacious in corrosion inhibiting paint compositions which can be applied to structural metal or vehicle component surfaces in the form of a paint coating by way of the conventional techniques including spray coating, dip coating, electrocoating or powder coating. The paint may either comprise a primer or it may be the sole coating on the surface. The materials have the advantages of nontoxicity and a low water solubility which provides an effective useful lifetime in a corrosive environment.

We have found that the corrosion inhibiting effect of metal tripolyphosphates can be evaluated electrochemically using techniques based on a method described by M. Stern ("Corrosion", Vol. 14 pp 440-444, 1958).

The metal tripolyphosphate is allowed to dissolve in a test cell containing aqueous potassium chloride (to provide electrical conductivity) and provided with a mild steel electrode and a non-reactive reference electrode. Corrosion inhibiting ions released into solution by the metal tripolyphosphate produce inhibition of the mold steel electrode. The degree of corrosion inhibition, is determined by measurement of currents following small perturbations in electrode potential in the region of its free corrosion potential. 100% inhibition is defined as that which allows no current to flow under the condition described above.

Electrochemical testing of metal tripolyphosphate pigments was at low (1 g/L) and high (100 g/L) concentrations in 0.1 Molar potassium chloride electrolyte. Metal ion and phosphorus containing ion concentrations in the supernatent were also determined. Pigments were screened by this method to establish which of those exhibited the most promising characteristics for inclusion into paint systems, i.e. low solubility and good corrosion inhibition. Results are summarized below in Table 1. For comparison two conventional corrosion inhibitors, zinc orthophosphate and zinc chromate and, for experimental purposes zinc pyrophosphate, have also been included in the Table.

TABLE 1

| Test Pigment | % inhibition* 1 g/L | pH | % inhibition* 100 g/L | pH | ppm ion conc. M | ppm ion conc. P |
| --- | --- | --- | --- | --- | --- | --- |
| $Zn_2NaP_3O_{10}.9H_2O$ | +90 | 6.36 | +97 | 4.42 | 32 | 23 |
| $Sr_2NaP_3O_7.7H_2O$ | +55 | 7.64 | — | — | 40 | 22 |
| $Sr_5(P_3O_{10})_2.17H_2O$ | +95 | 6.54 | +99 | 4.84 | 62 | 27 |
| $Sr_5(P_3O_{10})_2$ anhydrous | +90 | 6.55 | — | — | — | — |
| $Ba_5(P_3O_{10})_2.xH_2O$ | −25 | 7.15 | — | — | — | 10 |
| $Mn_5(P_3O_{10})_2.xH_2O$ | +91 | 6.37 | −96 | 2.82 | 55 | 32 |
| $Cu_5(P_3O_{10})_2.xH_2O$ | −55 | 5.69 | — | — | 16 | 10 |
| zinc orthophosphate | +10 | 7.01 | +43 | 6.78 | 5 | 2 |
| zinc chromate | +96 | 6.98 | +99 | 6.75 | — | — |
| zinc pyrophosphate | +39 | 5.92 | — | — | 22 | 8 |

*maximum attained during several days testing.

In some applications the corrosion inhibiting effect of the polyphosphate salts may be augmented by the presence of zinc ions. It is well known that zinc ions have a noticeable, if limited, corrosion inhibition effect. We have found that the presence of zinc in conjunction with polyphosphate provides inhibiting properties greater than those experienced with the polyphosphate alone. To illustrate this effect electrochemical measurements were made in solutions containing zinc oxide or zinc pyrophosphate in combination with metal tripolyphosphate, the metal polyphosphate and zinc salt being present together, each at a concentration of 1 g per liter. The results are summarized in Table 2.

TABLE 2

| Composition | pH | Inhibition | Zn ppm | P ion | M concn |
| --- | --- | --- | --- | --- | --- |
| $Zn_2NaP_3O_{10}.9H_2O$ + $Zn_2P_2O_7$ | 6.15 | 93% | 36 | 27 | — |
| $Zn_2NaP_3O_{10}.9H_2O$ + ZnO | 6.74 | 97% | 36 | 25 | — |
| $Ba_5(P_3O_{10})_2xH_2O$ + $Zn_2P_2O_7$ | 6.53 | 23% | 6 | 12 | — |
| $Sr_5(P_2O_{10})_2.17H_2O$ + $Zn_2P_2O_7$ | 6.56 | 87% | 0.9 | 27 | 59 |
| $Sr_2NaP_3O_{10}.7H_2O$ + $Zn_2P_2O_7$ | 6.77 | 89% | 1.2 | 27 | 40 |
| $Mn_5(P_3O_{10})_2.xH_2O$ + $Zn_2P_2O_7$ | 6.10 | 89% | 0.2 | 29 | 50 |
| $Cu_5(P_3O_{10})_2.xH_2O$ + $Zn_2P_2O_7$ | 6.03 | −13% | 0.6 | 7 | 6 |

Tripolyphosphate salts have also been found to exhibit corrosion inhibition for non-ferrous metals, parficularly zinc and aluminium.

By way of example penta-strontium tripolyphosphate $(Sr_5(P_3O_{10})_2.17H_2O)$ was prepared as previously described and used in electrochemical tests at 1 g/L pigment concentration in 0.1M potassium chloride. Test electrodes used were prepared from iron (for comparison), zinc and aluminium, and comparison was made with commercially available zinc chromate pigment at the same concentration. All inhibition results were obtained by comparison with the free corrosion of the test electrode metal in 0.1M potassium chloride without inhibitor being present. Results are summarized in Table 3.

TABLE 3

| Test pigment | Test electrode | % inhibition @ 1 day | % inhibition @ 10 days | pH @ 10 days |
| --- | --- | --- | --- | --- |
| $Sr_5(P_3O_{10})_2.17H_2O$ | Fe | 90 | 89 | 6.54 |
| $Sr_5(P_3O_{10})_2.17H_2O$ | Zn | 99 | 99 | 6.53 |
| $Sr_5(P_3O_{10})_2.17H_2O$ | Al | 94 | 57 | 6.51 |
| zinc chromate (ex ICI) | Fe | 96 | 98 | 6.89 |
| zinc chromate (ex ICI) | Zn | −185 | −185 | 6.88 |
| zinc chromate (ex ICI) | Al | −115 | +94 | 6.85 |

As can be seen zinc chromate appeared to actively promote corrosion of zinc and was slow to provide corrosion inhibition for aluminium. However penta-strontium tripolyphosphate gave good early protection of both zinc and aluminium.

As previously stated, the compositions described herein are particularly advantageous in the preparation of corrosion inhibiting paint formulations.

Paint formulations of the following compositions were prepared to compare penta strontium tripolyphosphate $(Sr_5(P_3O_{10})_2.17H_2O)$ with commercially available zinc orthophosphate $(Zn_3(PO_4)_2.2H_2O)$.

| Ingredient | Paint A | Paint B | Paint C |
| --- | --- | --- | --- |
| | parts by weight | | |
| Modified alkyd resin | 43.1 | 43.1 | 43.1 |
| Talc | 25.6 | 16.1 | 35.1 |
| Strontium tripolyphosphate | 9.5 | — | — |
| Zinc orthophosphate | — | 19.0 | — |
| $TiO_2$ | 9.0 | 9.0 | 9.0 |
| Yellow iron oxide | 1.8 | 1.8 | 1.8 |
| Bentone 38 | 0.2 | 0.2 | 0.2 |
| Metal driers (Pb, Co, Ca) | 1.2 | 1.2 | 1.2 |
| Antiskin agent | 0.1 | 0.1 | 0.1 |
| Xylene | 9.5 | 9.5 | 9.5 |

-continued

| Ingredient | parts by weight | | |
|---|---|---|---|
| | Paint A | Paint B | Paint C |
| Total | 100 | 100 | 100 |

The paints were prepared by high speed dispersion to a fineness of grind of 25 to 30 microns.

The paints were applied to clean mild steel coupons by spin coating and allowed to cure for several days. The resulting paint films, between 75 and 85 microns in thickness, were cross-cut with a sharp steel scriber. The coated coupons were subjected to accelerated hot salt fog testing in accordance with ASTM B117. After 500 hours the appearance of the pentastrontium tripolyphosphate coating (Paint A), judged by lack of rusting at the cross cut, was excellent. In comparison the zinc phosphate painted coupons showed some rusting and the blank control (Paint C) showed severe cross cut rust under the test conditions. The results are summarized in Table 4.

TABLE 4

Results of accelerated hot salt fog testing of mild steel coupons coated with high-build, short-oil alkyd test paints

| Active pigment sample | Proportion of active in total pigment (% w/w) | 500 hrs in salt fog |
|---|---|---|
| A. pentastrontium tripolyphosphate | 20 | No cross-cut rusting and no staining. |
| B. zinc orthophosphate | 40 | Some cross-cut rusting with slight staining. |
| c. control blank | None | Severe rusting of primer film and at cross-cut. |

These tests demonstrate the potential of formulating anti-corrosion paints for the metal tripolyphosphates described herein. They may be employed in a variety of applications, including their use in paints.

We claim:

1. In a corrosion inhibiting paint formulation including at least one metal polyphosphate corrosion inhibiting pigment dispersed in a vehicle containing a resin binder, the improvement comprising, as said pigment, a crystalline metal polyphosphate selected from the group consisting of pentastrontium tripolyphosphate and dizinc-monosodium tripolyphosphate.

2. A paint formulation as claimed in claim 1 wherein the resin is an alkyl resin.

3. A paint formulation as claimed in claim 1 wherein the resin is water soluble.

4. A paint formulation as claimed in claim 1 wherein the polyphosphate corrosion inhibitor comprises 7.5 to 40 weight % of the total paint composition.

* * * * *